United States Patent [19]

Carll et al.

[11] Patent Number: 4,688,183

[45] Date of Patent: Aug. 18, 1987

[54] FIRE AND SECURITY SYSTEM WITH MULTI DETECTOR-OCCUPANCY-TEMPERATURE-SMOKE (MDOTS) SENSORS

[75] Inventors: Richard T. Carll, Granby; Barry G. Blackaby, Avon, both of Conn.

[73] Assignee: United Technologies Corporation, Hartford, Conn.

[21] Appl. No.: 685,938

[22] Filed: Dec. 24, 1984

[51] Int. Cl.[4] .................... G06F 15/74; G08B 17/10; G08B 29/00

[52] U.S. Cl. .................... 364/554; 340/825.07; 340/506; 340/514; 364/138; 364/580

[58] Field of Search .............. 364/550, 551, 554, 557, 364/138, 184, 580; 340/505, 506, 514, 518, 515, 521, 522, 825.05, 825.06, 825.1, 825.54, 825.55, 870.09

[56] References Cited

U.S. PATENT DOCUMENTS

| | | | |
|---|---|---|---|
| 4,249,166 | 2/1981 | Schultz | 340/506 |
| 4,356,475 | 10/1982 | Neumann et al. | 340/521 |
| 4,468,655 | 8/1984 | Iwata | 340/518 |
| 4,530,045 | 7/1985 | Petroff | 364/138 |
| 4,589,081 | 5/1986 | Massa et al. | 364/554 |

*Primary Examiner*—Felix D. Gruber
*Attorney, Agent, or Firm*—Dominic J. Chiantera

[57] ABSTRACT

A fire and security system includes a hierarchical architecture with a central control processor monitoring each of a plurality of multi detector-occupancy-temperature-smoke (MDOTS) sensors mounted in each of the monitored spaces of the building, the MDOTS sensors connected in multi drop fashion in sensor loop networks which are connected to one of a plurality of master controls, each master control monitoring the sensor outputs from one or more sensor loops and reporting the alarm status of any one sensor to the central.

17 Claims, 8 Drawing Figures

CENTRAL CONTROL
MASTER CONTROL
MASTER CONTROL FIG. 3
MDOTS
MDOTS FIG.2

20
22
24
25
26
28
29
30
32
33
34
36
36A
36B
37
38
40
41
42
43
46
47
48
49

FIRE AND SECURITY SYSTEM WITH MULTI DETECTOR-OCCUPANCY-TEMPERATURE-SMOKE (MDOTS) SENSORS

DESCRIPTION

1. Technical Field

This invention relates to sensors, and more particularly to sensors for detecting environmental conditions in a living space.

2. Background Art

In all new construction of office buildings, both commercial and institutional, there is an increasing emphasis on providing efficient building services to the occupants. Typically referred to as "intelligent" buildings, these efficiencies result in economies in the cost of services to the building's tenants. In some instances new services are provided, in other cases old services are improved. In all cases the tenant's quality of life and safety improves.

These intelligent buildings include a building information system which monitors building functions. One aspect covers performance monitoring of the building's equipment. This includes monitoring and controlling elevator dispatching, heating-ventillating-air conditioning (HVAC) performance, and telephone system operation. All monitored information is provided to a central maintenance location to permit central supervision and action on repairs.

Another aspect of information system monitoring convers fire and security. These functions are becoming increasingly important as the size and tenancy of these buildings increase. At present, this surveillance is limited in scope. Security surveillance, e.g. guards, cameras, are limited (by necessity of cost) to building perimeter surveillance of entrances and exits, or access to individual floors of the building. Similarly fire surveillance is limited, generally per floor.

It is desirable to increase the quantity of environment surveillance to include living spaces within a floor, e.g. individual rooms, offices. This ability to pinpoint fire or security intrusions will do the most for providing fast, corrective response.

DISCLOSURE OF INVENTION

One object of the present invention is to provide a system for automatic alarm monitoring of fire and security conditions within spaces of a building. Another object is to provide a system for reporting the actual values of selected environmental parameters within each space reporting an alarm condition. Still another object is to provide a multi-detector for mounting in each space for sensing the building space environmental conditions.

According to one aspect of the present invention, a fire and security system includes a hierarchical architecture with a central control processor monitoring each of a plurality of multi detector-occupancy-temperature-smoke (MDOTS) sensors mounted in each of the monitored spaces of the building, the MDOTS sensors connected in multi drop fashion in sensor loop networks which are connected to one of a plurality of master controls, each master control monitoring the sensor outputs from one or more sensor loops and reporting the alarm status of any one sensor to the central.

According to another aspect of the present invention, the MDOTS sensors each include a signal processor with memory and clock, and include occupancy, temperature, and smoke sensors for providing discrete signal reporting of occupancy and smoke within the space, and for reporting the actual space temperature, the signal processor providing periodic real time sampling of each sensor output and storing the real time samples in memory for retrieval by the master control processor. In further accord with this aspect of the invention, the MDOTS sensors further provide information on the rate of temperature change and lapsed time of occupancy to quantify the environmental status of the spaces to assist in determining the urgency of an alarm condition.

In further accord with the first aspect, the fire and security system reports all alarm conditions to the central control, the central control being capable of polling each MDOTS sensor to obtain, alternately and in combination: smoke detection, actual temperature, rate of change of temperature, occupancy, and lapsed time of occupancy, to permit a quantitative determination to be made at a central location of the urgency of an alarm state reported in one or more remote spaces of the building.

The present invention provides an automatic fire and security system capable of simultaneously monitoring all spaces of a building. The use of MDOTS sensors in the system allows environmental conditions in each of the spaces to be monitored from a single central location. The space conditions may be defined in a sufficiently definitive way to allow fire and rescue personnel to make accurate assessment and deployment of assistance. This lessens the potential for injury to both occupants and to the rescue personnel.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
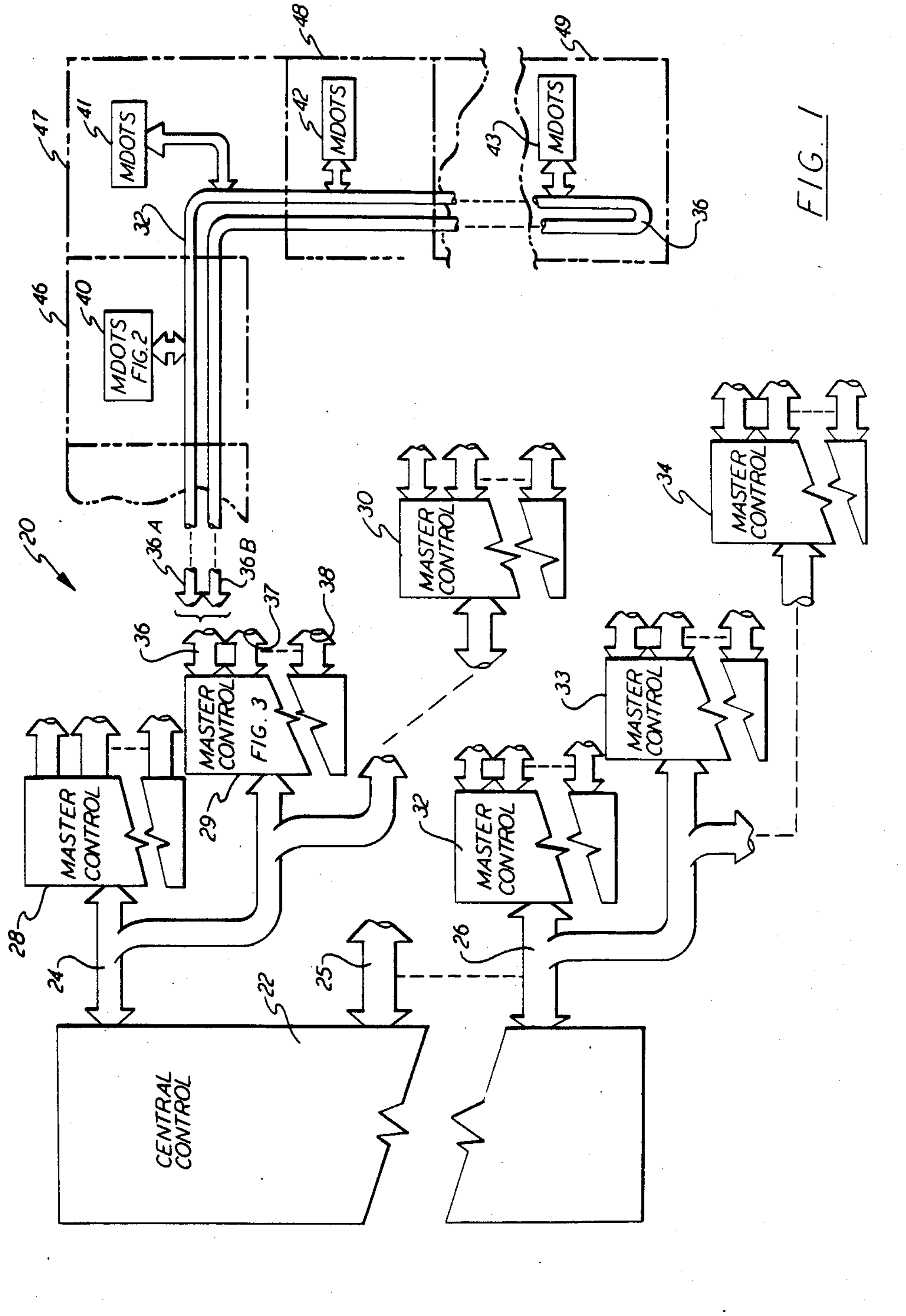
FIG. 1 is a system block diagram of a best mode embodiment of a fire and security system according to one aspect of the present invention.
Figure 4:
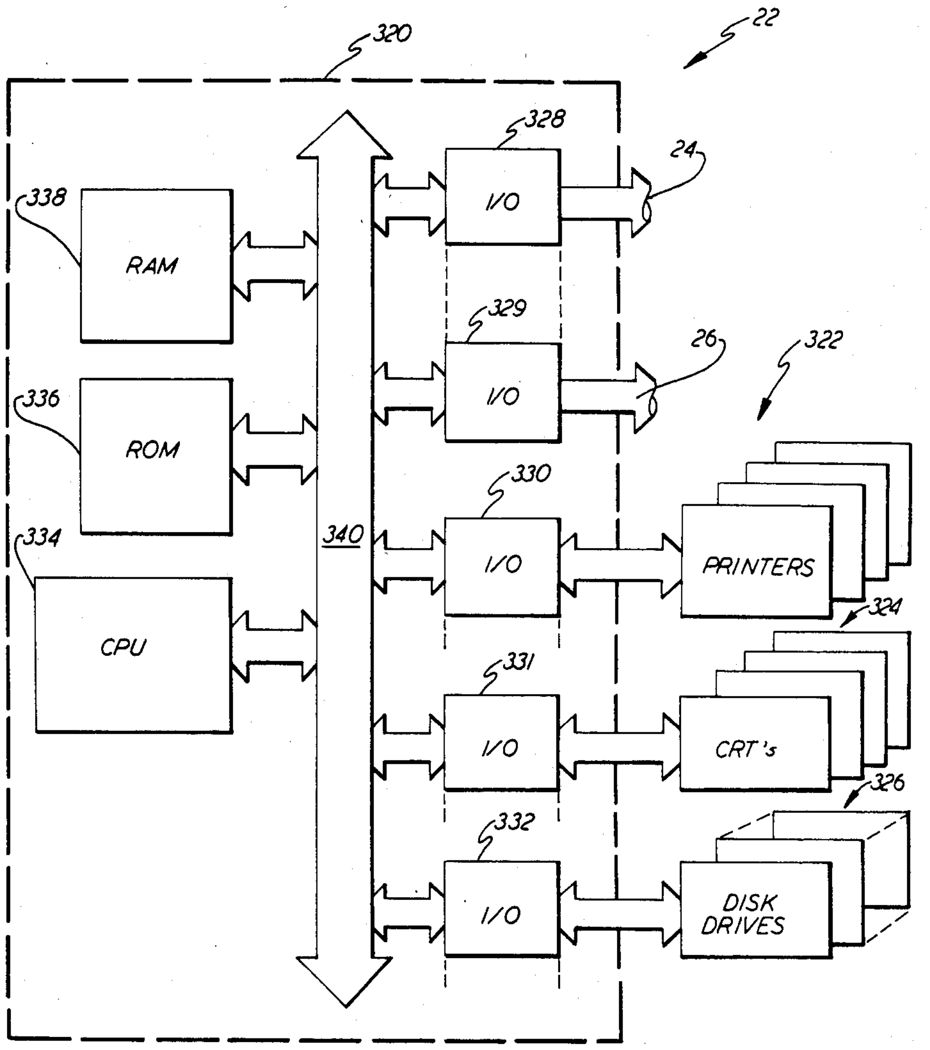
FIG. 4 is a system block diagram of a best mode embodiment of a central control for use in the embodiment of FIG. 1.

Referring to FIG. 1, in a simplified block diagram of a Fire and Security (FS) system 20 according to the present invention, the system has a hierarchical architecture. A central control 22, described hereinafter with respect to FIG. 4, is connected through one or more trunk lines 24–26 to a plurality of master controls associated with each trunk. The master controls are arranged in groups as illustrated by master controls 28–30 and 32–34 for the trunks 24, 26. Typically the trunk lines provide half-duplex communication between the central and master controls.

Each master control is connected through one or more sensor bus lines (bus lines 36–38 for the master 29) to a plurality of Multi Detector-occupancy-temperature-smoke (MDOTS) sensor networks; one network for each bus. As shown for the sensor bus 36 of master control 29, each network includes a plurality of MDOTS sensors 40–43 connected in multi drop fashion along the bus. The sensors are disposed in individual living spaces 46–49 of a building, or other structure. These spaces may be enclosures, such as offices, or non-enclosed sites located on one or more floors of the building.

The sensor bus is preferably a loop with both ends terminated at the master control to provide bi-directional communication. In the event of a break in the bus the master can reverse direction to access the MDOTS sensor(s) isolated by the break. It should be understood, however, that a single direction bus may be used if deemed necessary at a lesser degree of system reliabilty.

The central control can communicate through the master control to any sensor in the system. Typically each network includes up to sixteen MDOTS sensors connected to each sensor bus. There are typically four sensor buses per master for a total of up to sixty four sensors for each master control. Similarly, there typically are four master controls connected in multi-drop fashion to each central control trunk line, for a total of two hundred and fifty six (256) sensors per trunk. Finally, there are nominally four trunk lines in the central control for a system total of one thousand twenty four (1024) MDOTS sensors. That means that a typical fire and security system can monitor up to one thousand twenty four living spaces which can include offices, storerooms, passageways, etc.

With an assumed forty selected monitoring spaces per floor, the typical system can service a twenty five story building. The environmental conditions in each space in the twenty five floor building are continuously monitored and reported to a central location. This permits surveillance by a limited number of building staff security. This also permits the central control to function as a command station for fire and rescue personnel in providing assistance during alarms.

Figure 2:
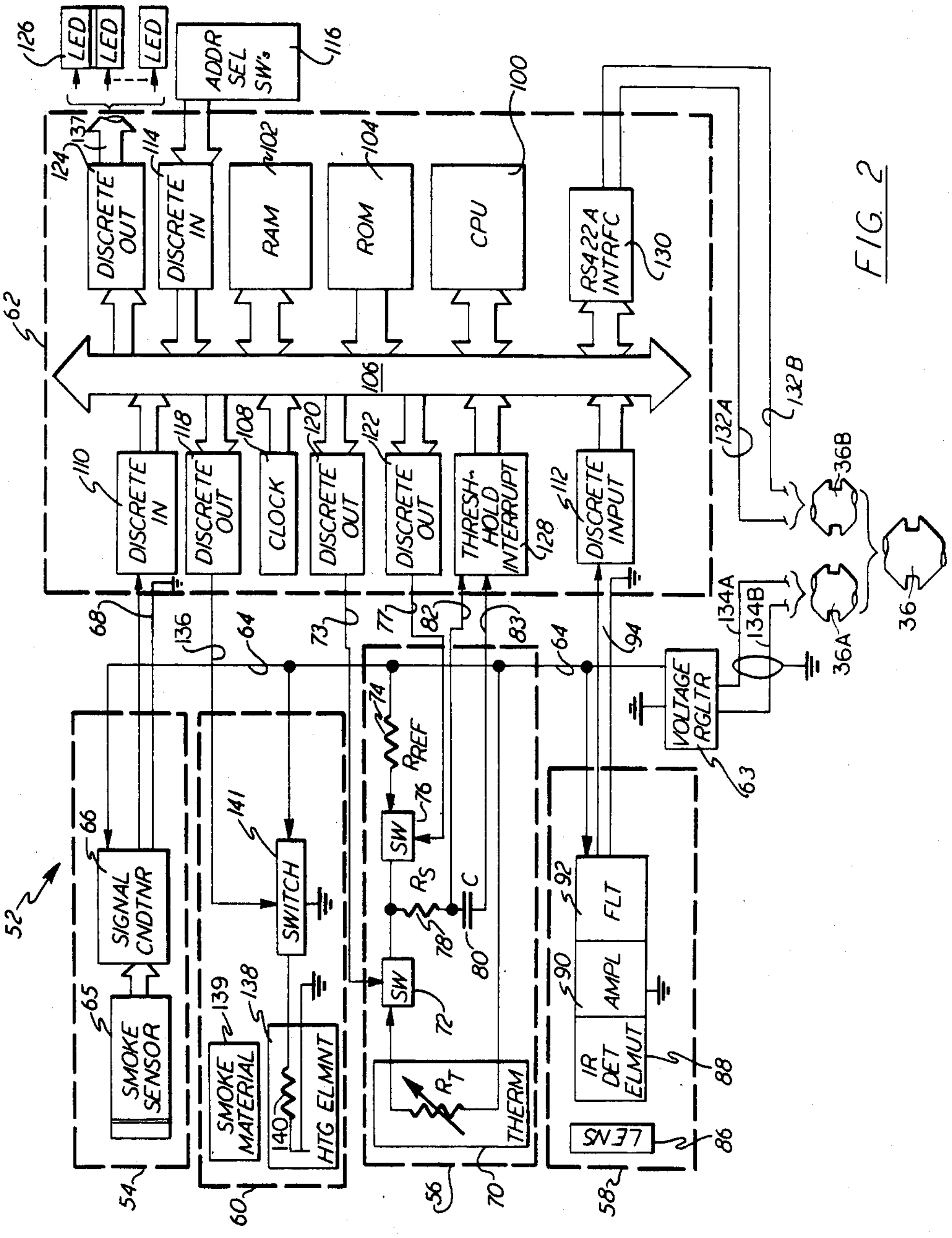
FIG. 2 is a simplified block diagram of a best mode embodiment of an MDOTS sensor in accordance with another aspect of the present invention, for use in the embodiment of FIG. 1.

FIG. 2 illustrates the major elements of an MDOTS sensor 52, including a smoke detector 54, thermistor assembly 56, occupancy detector 58, self-test apparatus 60, a signal processor 62, and a voltage regulator 63. The regulator provides a regulated VDC output on bus 64. The smoke detector 54 includes smoke sensor 65 connected to signal conditioning circuitry 66. The smoke sensor is of a known type utilizing the ionization chamber principle capable of detecting pre-visible gaseous products of combustion. Each smoke sensor is designed to cover an area of approximately 1000 square feet of space within a building. The signal conditioning circuitry, which is connected to the regulated VDC bus, conditions the smoke sensor output to provide a smoke discrete signal in the presence of detected smoke in the space. The smoke discrete signal is provided on lines 68 to the signal processor input.

The thermistor assembly 56 includes a known type thermistor element 70; typically a positive temperature coefficient resistance element; i.e. the resistance of the element increases in value, following a characterization curve, with actual temperature increase. The element has a nominal 10K ohms impedance at 25° C. The thermistor is connected between the regulated voltage bus 64 and the input to a gate switch 72. The switch receives a gate signal input on a line 73 from the signal processor. A reference resistor $R_{REF}$ 74 is also connected between the voltage bus and the input to a second gate switch 76, which is responsive to gate signals on a line 77 from the processor. The outputs of both switches are connected in common to a series combination of a resistor 78 and capacitor 80. The capacitor is connected on each end through lines 82, 83 to the processor.

In operation, with the thermistor element impedance at a value corresponding to the actual temperature of the space, the process or turns on switch 72 and measures the time that it takes the rising exponential voltage signal on the capacitor, charging through the thermistor impedance value, to interrupt a selected threshold value set in the processor. At that point switch 72 is turned off and the capacitor discharged through lines 82, 83. The processor then turns on switch 76 to charge the capacitor through the known time constant provided by reference resistor ($R_{REF}$). The two measured time interval values are placed in ratio, and the ratio value is applied to the characterization curve of the thermistor to obtain the actual thermistor resistance value, from which the actual temperature value is determined. The successive turn on of switches 72, 76 nominally occurs at one second intervals, with the actual interrupt time being on the order of 0.1 second.

The occupancy detector 58 includes a lens assembly 86 with a field of view sufficient to detect intrusion of the living space. The detector uses an infrared detector element 88. The element is pyroelectric, i.e. sensitive to temperature change. The IR detector output signal is amplified by amplifier 90, with an approximate 120:1 gain, and filtered with a low pass filter 92. The output signal from the filter is presented as an occupany discrete signal on lines 94 to the signal processor. One type of infrared sensing device which may be suitable for use as the occupancy detector 58 is the Infracon® Model IR Detector available from Tishman Research Company.

The infrared detector 88 responds to the infrared radiation present in the frequency spectrum emitted by the human body. In the Infracon device the lens 86 is coated with a infrared-transparent germanium coating which provides optical filtering to pass only a narrow band of infrared radiation containing the frequency spectrum bandwidth of interest. This typically includes radiation having wavelengths between eight and thirteen and one-half microns. The optical filter narrows the spectral sensitivity of the detector to reject wavelength signals outside of this selected bandpass. A suitable detector is the Model 2M Thermopile Detector sold by Dexter Research Center of Dexter, Mich. The ouput from the fiter 92 on lines 94 is a discrete signal indicating the presence or absence of human occupancy within the monitored space.

The signal processor 62 includes a central processing unit (CPU) 100 with RAM 102 and ROM 104 memories interconnected through an internal bus 106. The CPU is preferably an eight bit microprocessor of a type known in the art, such as the Zilog Z8, or equivalent. The RAM and ROM memories are integrated onto the same circuit (IC) with RAM storage capacity typically 128 bytes and the ROM 4096 bytes. A clock 108 provides the signal processor and MDOTS sensor time base.

The remaining signal processor elements are input-/output (I/O) devices. Discrete input devices 110, 112, and 114 receive the discrete signal inputs from the smoke detector 54, occupancy dectector 58, and address select switches 116, respectively. The address switches are manual switches responsive to operator setting, which identifies the particular MDOTS address within the network. Discrete output devices 118, 120, 122, and 124 provide discrete output signals: on lines 136 to the test apparatus 60, on lines 73 and 77 to the thermistor asembly 56, and on lines 137 to light emitting diodes (LEDs) 126 which provide local annunciation of alarm conditions within the MDOTS. The LED annunciation is an optional feature useful to building maintenance personnel to verify alarm conditions reported to the central controller.

Threshold-interrupt circuitry 128 monitors the voltage across the capacitor 80 of the thermistor circuitry and discharges the capacitor following each ratiometric sample. The communications I/O with the sensor bus is a serial bit RS422A interface 130. A serial bit RS422A interface 130 provides communication between the MDOTS processor internal bus 106, through lines 132A, 132B which, with the power conductor pair 134A, 134B, are connected to the sensor but 36 (FIG. 1).

The test circuitry 60 provides self testing of the sensor's smoke detector 54, thermistor assembly 56, and occupancy detector 58. The test circuitry includes a resistive heating element 138 having a coating 139 disposed adjacent the heating element filament 140. The heating element connected through a gated switch 141 to the regulated VDC bus 64. The switch is gated by signals on the line 142 from the discrete output 118 of the signal processor. In response to a test command from the master control, the MDOTS CPU 100 energizes, heating element 138 by gating the switch 141 to provide current flow from the bus to the element.

The switch 141 is gated on for a limited time interval, typically ten seconds or less at a current of 500 milliamps. In the test interval the heating element filament 140 achieves a critical test temperature sufficient to: (i) cause the coating 139 to melt, thus emitting a small discharge of smoke in the vicinity of the smoke detector 54 sufficient to excite the smoke sensing element 64, (ii) elevate the temperature of the thermistor 70 by a minimum, measurable temperature step value, and (iii) excite the pyroelectric IR detector element 88 of the occupany detector 58. The test excites both detectors and the thermistor into a measurable response which is used to validate device operation.

The heating element 138 and coating 139 are located adjacent to the detectors and thermistor so as to activate each of them at a relatively low elevated temperature. The coating material is of a type well known in the art, similar to a solidified version of Dampfdestillat produced by Seuthe-Schley Gmbh, (West Germany). This material exhibits the unique property of emitting, under low heat conditions, a gaseous discharge capable of causing the smoke sensor's ionization chamber to substantially change its conduction coefficient and provide the smoke discrete signal on line 68 to the signal processor.

In operation, the MDOTS CPU signal processor samples the signal outputs of the smoke detector, the occupancy detector, and the thermistor, periodically, typically at one-half second intervals. The most recent sample values are stored in RAM 102. In the presence of a smoke discrete signal on lines 68, or an occupancy discrete signal on lines 94, the CPU activates an interval timer to record the elapsed real time since the appearance of either discrete signal. At each subsequent sample the CPU reads the elapsed time value and stores the value in RAM.

Similarly, the CPU monitors the real time interval between thermistor sample values. The successive temperature sample values together with the interval time between samples provides a temperature rate of change signal. The CPU calculates the temperature rate of change for each calculated temperature. Therefore, the MDOTS includes in RAM, at any one time, information related to the presence or absence of smoke and occupancy, the actual space temperature, the rate of change in space temperature, and the lapsed time accumulated between the presence of either smoke or excessive temperature parameters and the last determined occupancy.

The quantitative information provided by the sensors allows the central control operator to precisely determine the present environmental state conditions of all protected spaces to permit demographic display of the sensed parameters. In the event of fire, the demographic display can provide information on the spread of smoke throughout a given floor together with a temperature profile indicating the concentration, i.e. the intensity and location of the flames. This is extremely helpful in planning rescue access with minimum endangerment to rescue personnel.

Figure 3:
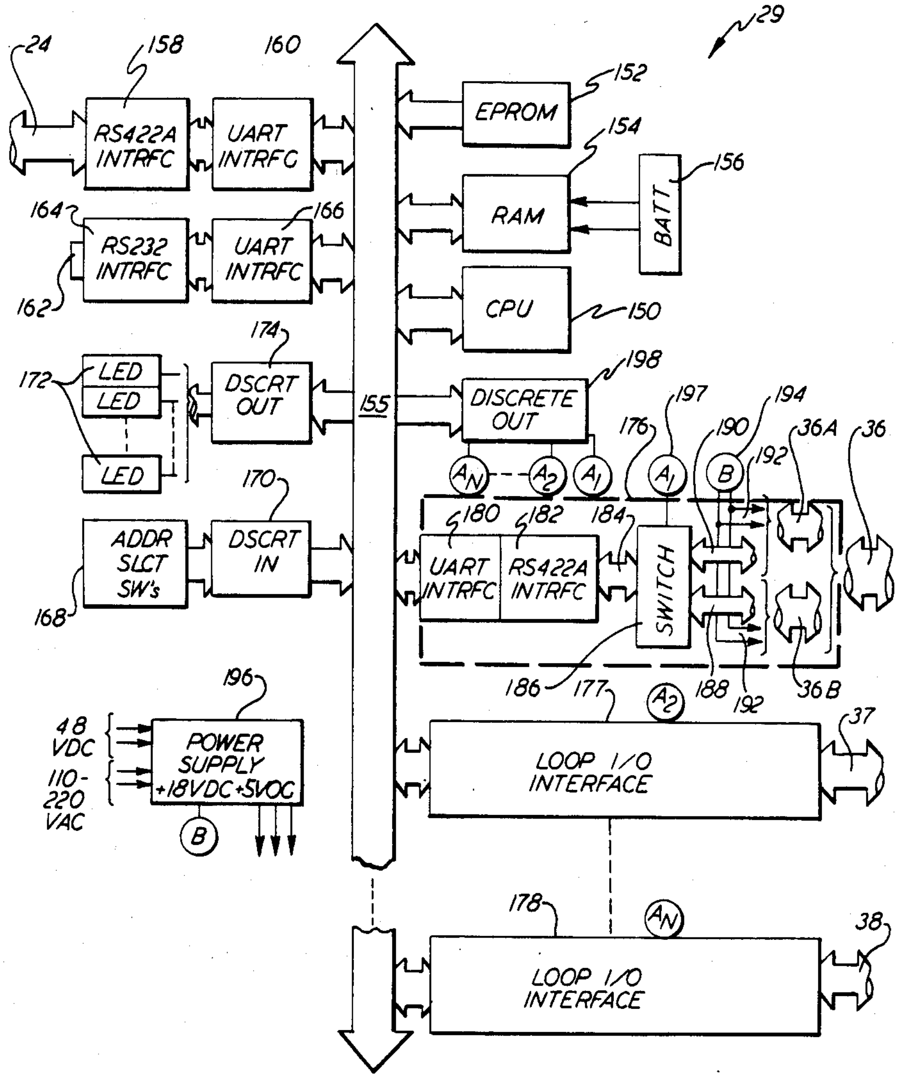
FIG. 3 is a system block diagram of a best mode embodiment of a master control for use in the embodiment of FIG. 1.

FIG. 3 illustrates the configuration of the master control 29 (FIG. 1) in the fire and security system of FIG. 1, which is representative of all. The master control 29 receives the trunk lines 24 from the central control 22, and the MDOTS sensor bus loops 36–38. The control includes a CPU 150 with program memory 152 and ramdom access memory (RAM) 154 connected to the CPU through the bus 155. The RAM is nonvolatile with battery, backup 156. The program memory is preferably an electronically programmable read only memory (EPROM).

The CPU, EPROM, and RAM are known devices. The CPU is an eight bit microprocessor typically a Zilog Z80B or equivalent. The CPU and memory must be large enough to provide continuous monitoring of all sixty four sensors connected to the master control. This includes accelerated monitorng of the sensors in the presence of alarm conditions.

The trunk line 24 from the central control is received at an RS422A interface 158 and coupled through a Universal Asynchronous Receiver Transmitter (UART) interface 160 to the bus 155. An optional "service tool" input 162 is provided to permit a maintenance operator to connect directly into the master control for purposes of testing and/or reprogramming, as necessary. The service tool interface uses a RS232 interface 164 with accompaning UART 166. The master control also includes address select switches 168 which are operator programmable, and coupled through discrete input interface 170 to the bus. Similarly, the master includes local annunciation of alarm and/or test conditions with LEDs 172, which are energized through discrete output interface 174.

The sensor bus loops 36–38 are serviced by associated loop I/O interfaces 176–178. As illustrated by the loop interface 176, each includes a UART 180 and serial RS422A interface 182. The RS422A is connected through lines 184 to a gated switch 186 which connects the RS422A to one or both ends of the communication pair of lines 188, 190 included in the sensor loop 36. As shown in FIG. 3 the two ends of the loop 36 are labeled 36A and 36B. As described hereinbefore with respect to the MDOTS sensor of FIG. 2, the second conductor pair is a power pair 192 from a VDC output B 194 of the master control power supply 196. The power supply provides VDC excitation to the MDOTS, typically +18 VDC, and a regulated logic supply voltage, typically +5 VDC, to the master control IC logic circuitry. The power supply may receive either 48 VDC, or 110–220 VAC.

The master control determines which direction transmission will occur between itself and the MDOTS connected to a sensor loop. As described in more detail hereinafter, the master polls each MDOTS periodically, approximately ninety second intervals, requesting MDOTS sensor status. Should any sensor fail to respond the master completes polling the remaining sensors and then transmits through both ends simultaneously in an attempt to make communications with the nonresponding sensor. The master transmits through both ends of the loop in response to a CPU command in the form of a gate signal ($A_1$) 197 from discrete output circuitry 198.

The master control coordinates the alarm reports and data from all sixty four MDOTS sensors connected to it. It provides the first level alarm reaction. As described with respect to FIGS. 5, 6, in the presence of a sensor alarm the master establishes a virtual data channel between the sensor and the central control. It provides the central with the initial alarm data in the form of: actual space temperature, rate of change of temperature, smoke and occupancy, and any lapsed time indications from the presence of smoke or occupancy. The master control initiates increased polling of the alarmed MDOTS sensor, from the nominal once per ninety second interval to a once per ten second exchange. Once established, the high polling rate is maintained until the alarm condition subsides or the master control is commanded by the central to reduce the rate. The high sample rate allows the central control to track the actual floor conditions as space temperature increases, or smoke sensing conditions spread to other spaces.

In the best mode, the master to control-to-MDOTS communications is based on a "token ring protocol". A "token message", one byte long, is transmitted by the master to a first MDOTS in each sensor loop network, at approximate one second intervals. The master addresses the token to the first MDOTS sensor in the loop, which if there is no alarm condition to report, changes the address and passes the token to the next sensor in the loop. The process continues and if no alarms are reported by any of the sixteen sensors the token is returned to the master.

Each token cycle takes approximately one hundred milliseconds in the absence of alarm reporting. In the presence of an alarm the MDOTS sensor "captures" the token so as to be able to transmit an "alarm message" to the master. The sensor waits for an acknowledge (ACK) from the master, and will retransmit up to five times in the absence of the ACK. Once the ACK is received the alarmed sensor changes the token address and passes it to the next sensor in the loop. Upon completion of the token cycle, the master determines which sensors were in alarm and then issues specific instructions to each via the "capture token" methodology to present all pertinent alarm data. At completion of this exchange, the master passes the combined alarm status on to the central control on the next master token cycle.

Figure 5A:
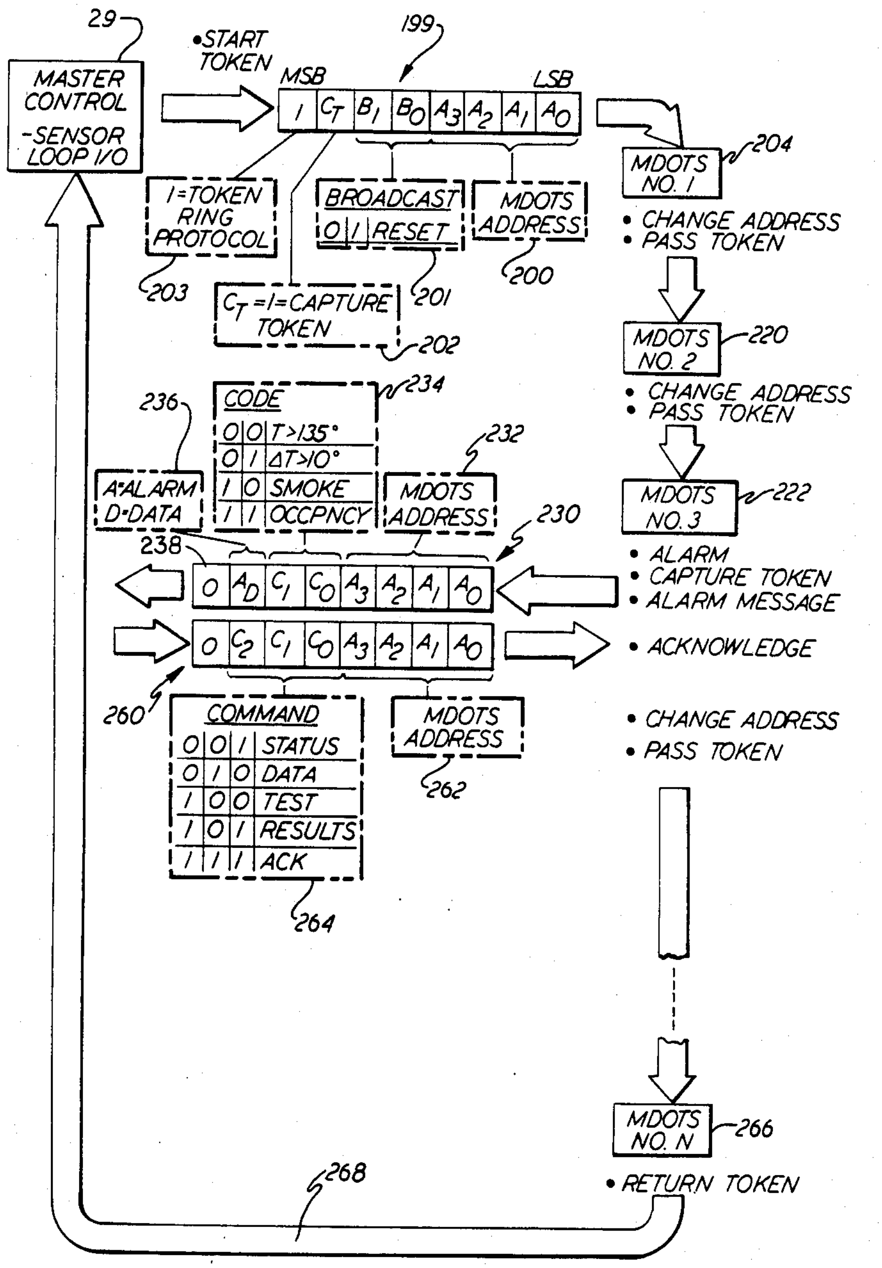
FIGS. 5A, 5B is a diagram illustrating the information protocol between the MDOTS sensor and master control embodiments of FIGS. 2 and 3, as used in the system embodiment of FIG. 1.
Figure 5B:
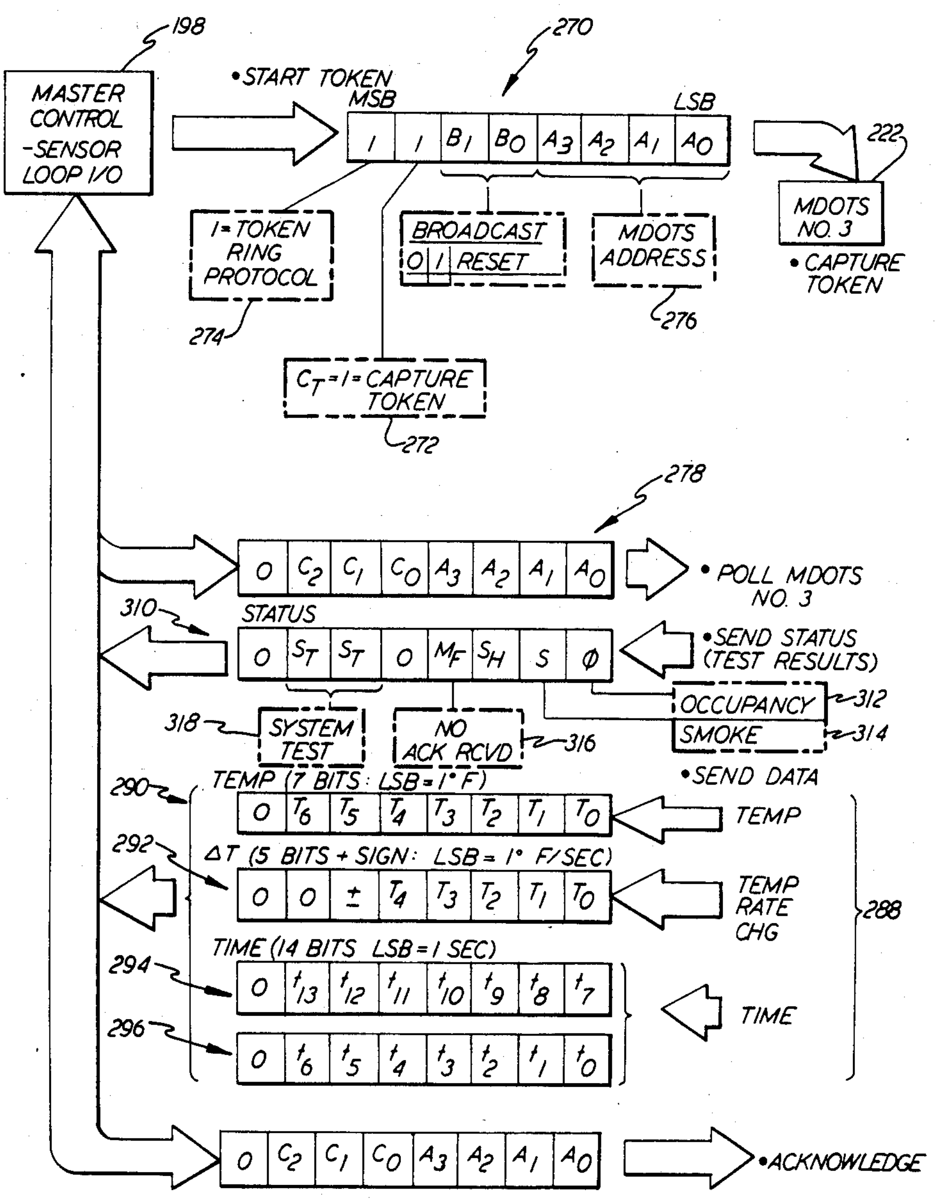
Figure 6:
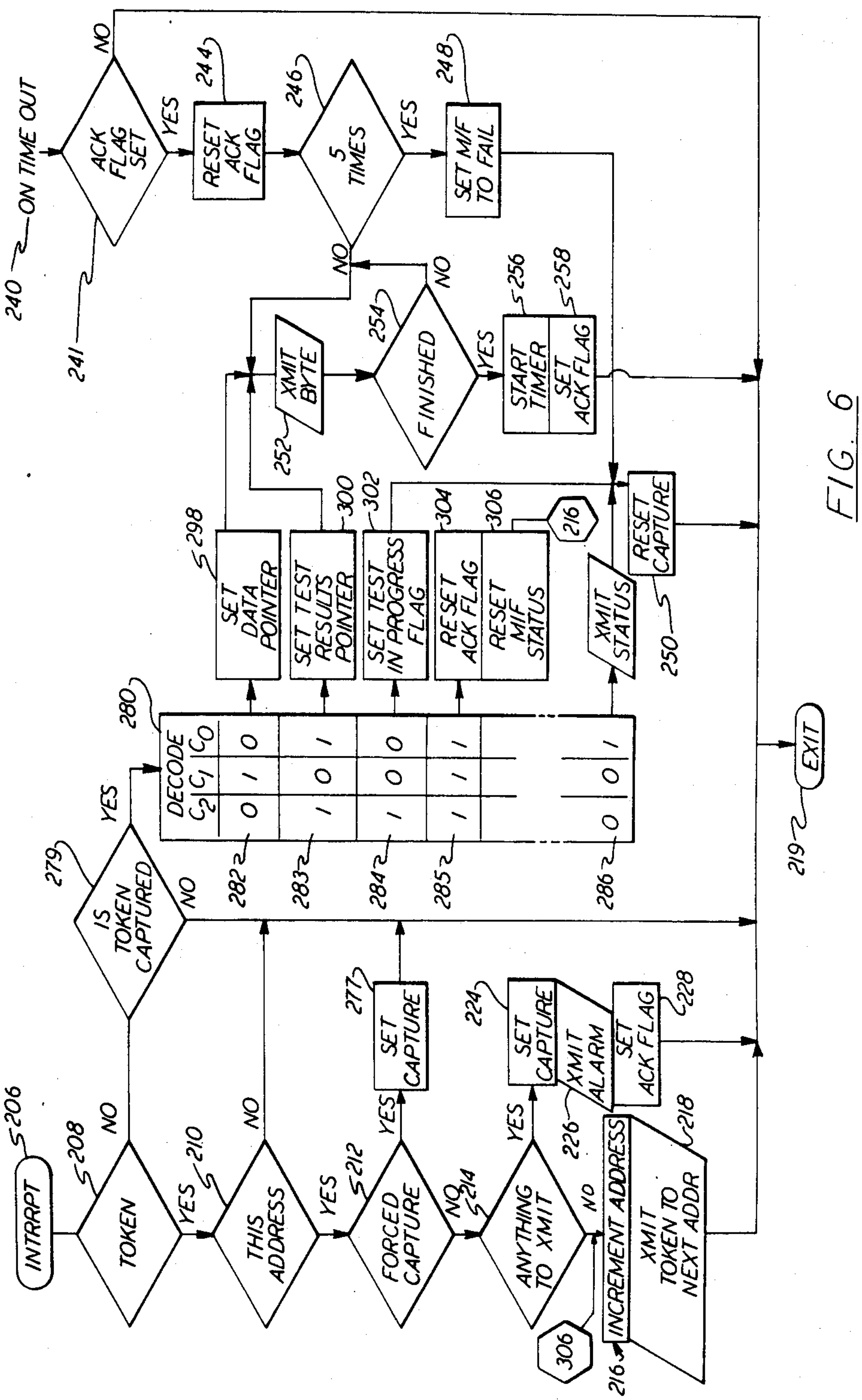
FIG. 6 is a flowchart diagram illustrating the operation of the MDOTS sensor embodiment of FIG. 2.

Referring now to FIGS. 5A, 5B, and 6. In FIG. 5A, a master control 29 transmits a token message 199 to each sensor loop at one second intervals. The token message byte includes a four bit MDOTS address 200 ($A_0$–$A_3$), two bit ($B_0$–$B_1$) broadcast command 201 (general commands to all MDOTS in the loop), a "capture token" (CT) bit 202, and an MSB "token bit" 203. The assigned address is to one of sixteen sensors in the loop. The broadcast bits offer general commands, e.g. RESET of all MDOTS sensor states, etc. The CT bit commands the addressed MDOTS to "capture the token" (CT=1). The MSB identifies the token passing protocol, as opposed to polling protocol. MSB=1 indicates that a token protocol is to be used.

The token message is received by the first MDOTS 204 in a network. The message interrupts the sensor CPU (100, FIG. 2), as shown by interrupt 206 of FIG. 6. Decision 208 determines if the interrupt is a token message (MSB=1). If YES, decision 210 determines if the address is that of the particular sensor. If YES, decision 212 determines if it is a "forced capture" (e.g. CT=1). If NO, decision 214 determines if there is an alarm condition to transmit. Assuming NO, instructions 216 increment the address and subroutine 218 transmits the token message to the next MDOTS in the network.

This is shown diagrammatically in FIG. 5A with the transmittal of the token to the second sensor 220. The second sensor is without an alarm condition and passes the token to the third MDOTS 222 which does have an alarm condition. For the third sensor the answer to decision 214 (FIG. 6) is YES and instructions 224 set the capture of the token. Subroutine 226 transmits the alarm message to the master control and instructions 228 set the acknowledge flag in the sensor CPU, after which the sensor exits the routine.

The alarm message 230 is shown in FIG. 5A. The lower bits address 232 is the alarmed sensor, the next two higher bits ($C_0$, $C_1$) 234 are a two bit code 234 reporting the alarm state, the next bit 236 is an Alarm/Data Bit, and the MSB 238 is set to zero indicating that the message is not a token. The bits $C_0$, $C_1$ decode into four alarm states including (i) actual temperature greater than a selected high temperature value, (e.g. 135° F.), (ii) a rate of change ($\Delta T$) greater than a selected rate (e.g. +10° F./sec), (iii) the presence of smoke, and (iv) presence of occupancy. The A/D bit indicates an alarm (AD=1), or a data message (0).

The sensor waits for a master acknowledge. The sensor times-out the wait and if no ACK is received it retransmits the alarm. FIG. 6 illustrates that following the time out 240 decision 241 determines if the ACK flag is set. If NO (the ACK message has been received), the sensor CPU exits at 219. If decision 241 is YES (no ACK received), instructions 244 reset the ACK flag and decision 246 determines if the ACK has been reset five times. If YES, instructions 248 set a MF (message failure) bit (described hereinafter with respect to FIG. 5B) to the fail state. Instructions 250 reset the capture, which releases the token message back to the bus, after which the CPU exits.

If decision 246 is NO, subroutine 252 again transmits the alarm byte message. Decision 254 determines if the transmission is finished, instructions 256 start the interval timer, and instructions 258 set the ACK flag.

In FIG. 5A, the master control transmits the ACK message 260. The MSB is zero. Address bits 262 identify the alarm sensor and command bits 264 ($C_0$-$C_2$) provide an eight state command instruction library. For an ACK the command bits are all set to one. Following receipt of the ACK the sensor releases the token, i.e. changes the address and passes it to the next sensor in the loop. The last sensor 266 returns the token 268 to the master, completing the token cycle.

Following receipt of the ACK the master control and alarm sensor engage in an information transfer. The master polls the sensor to obtain status and sensed data results. This dialog is initiated by the master with a "capture token" message byte 270 (FIG. 5B). In the capture token message the CT bit 272 is set high (CT=1) and the "token" bit 274 is also set high (MSB=1). The address bits 276 identify the alarm state sensor (MDOTS No. 3).

In FIG. 6, the capture token causes a YES decision 212, and instructions 277 set the capture flag in the sensor CPU. This means that all messages addressed to the sensor must be received. The sensor is in a vertical data link with the master. The next command message received (278, FIG. 5B) results in a NO to decision 208 and a YES to decision 279. The sensor CPU then decodes the three bit command message state ($C_0$-$C_2$) in instructions 280. Five decode states 282-286 are shown. The decode state 282 requests data transfer. FIG. 5B shows the multiple data transmission subroutine bytes 288. These include a temperature byte 290 with seven bits of temperature information, the LSB being equal to 1° F. This covers the difference temperatures of the ambient temperature range 32-150°F. Data byte 292 provides temperature rate information in five bits plus a sign bit; the LSB equaling 1°F/second. Data bytes 294, 296 are lapsed time information. A total of fourteen bits with the LSB equaling one second; total time is more than four and one half hours. The data transfer routine is initiated with instructions 298 which sets the data pointer, after which instructions 252-258 transmit the data bytes, start the interval timer, and set the ACK flag.

Decoded state 283 requests internal test results. Instructions 300 set the test results pointer and instructions 252-258 transmit the information. State 284 commands the sensor self test routine to energize the sensor heating element (138, FIG. 2), and instructions 302 set the "test in progress" flag thus inhibiting alarm generation and initiating the test sequence. Instructions 250 reset the capture flag and the sensor exits. State 285 is the master control acknowledge, and instructions 304 reset the ACK flag and set the MF bit status to good, after which instructions 250 reset capture. The decoded state 286, the last one shown, requests a sensor status report. The sensor CPU executes routine 308 which transmits the status message byte, then resets the capture and exits the program. As shown in FIG. 5B, the status message byte 310 includes from LSB to MSB, the occupancy discrete signal bit 312, smoke discrete bit 314, a reserved bit, the MF bit 316, a second reserved bit, and the system test result bits 318.

The system data rate is typically 2400 baud. With ten bits per message, i.e. eight information bits plus start and stop bits, the transfer is approximately 240 bytes/second. The master controls coordinate the alarms and data from each associated sensor. As stated there are typically sixty four sensors; sixteen per sensor loop and four loops per master.

The master controls provide the first level alarm reaction. Although not shown, the fire and security system of the present invention may interact with the building's existing HVAC system. In the event of a fire alarm the master may take immediate action in closing HVAC duct dampers and overriding the air handlers servicing the alarm spaces. This can be accomplished through the central control which can interface the two systems.

The master controls also synchronize the communications lines and provide token cycle initiation. They perform as autonomous data concentrators, reading and buffering temperature and motion data (frequency of occupation) over extended intervals, typically fifteen minutes for presentation to the central control at more relaxed intervals, e.g. once per six hours. This allows creation of an historical data base for use by building maintenance personnel in modifying or correcting services, e.g. correct for floor temperature gradients.

In the event of a sensor alarm, the responsible master control establishes a vertical data channel to the central control. It provides the central with initial alarm data (temperature, rate of temperature rise, smoke, and occupancy), then increases the poll rate to the alarmed sensor(s) to once per ten seconds. This enables the central control's CRT screens to be updated at the increased rate.

Referring to FIG. 4, a basic configuration central control 22 includes a signal processor 320 with peripheral printer(s) 322, CRT(s) 324, and mass storage 326 (e.g. disk storage). The processor is connected to the peripherals and to the master control trunk lines 24-26, through I/0 interfaces 328-332. The processor CPU 334 and resident program and random access memories 336, 338 are interconnected with the I/O's through the processor bus 340. The CPU is a known type, typically a DEC PDP-11 derivative model. Similarly the RAM memory is that provided by the same manufacturer in quantity, on the order of 512K bytes.

In a full sensor compliment system, e.g. 1024 MDOTS, the central would include a plurality of printers and CRTs; typically four each. The mass storage device(s) are preferably hard disk with up to 20M bytes of storage. Although shown as a peripheral the hard disk drive(s) may be resident within the processor 320. Although not shown, other peripheral devices may be added to the central, as necesary, to interface the F&S system with other related building systems such as HVAC, and an auto-dialing modem interface to enable the system to pass alarms off site during unmanned operation.

The central control processor is the highest intelligence in the system. It is the point at which system data is presented to an operator. The processor is programmed on an application specific basis to accurately portray floor plans and sensor deployment throughout the protected spaces of the building.

The central control characterizes each alarm for display in an English description, for ease of understanding. The CRT(s) 324 provide real time display of system status, and the printers 322 provide a chronological log, that allows real time and post alarm tracking of major fire situations. Each sensor alarm is captured and printed on this log. An alarm condition that starts as smoke, spreads to excessive rate of temperature rise, and finally excessive temperature, are all tagged on the printed record. This provides superior diagnostic capability. For example: being able to correlate motion in the vicinity of smoke or temperature could help determine arson. Similarly, knowing the rate of rise of temperature at the time of first smoke could aid in determining if an accelerant were used.

Figure 7:
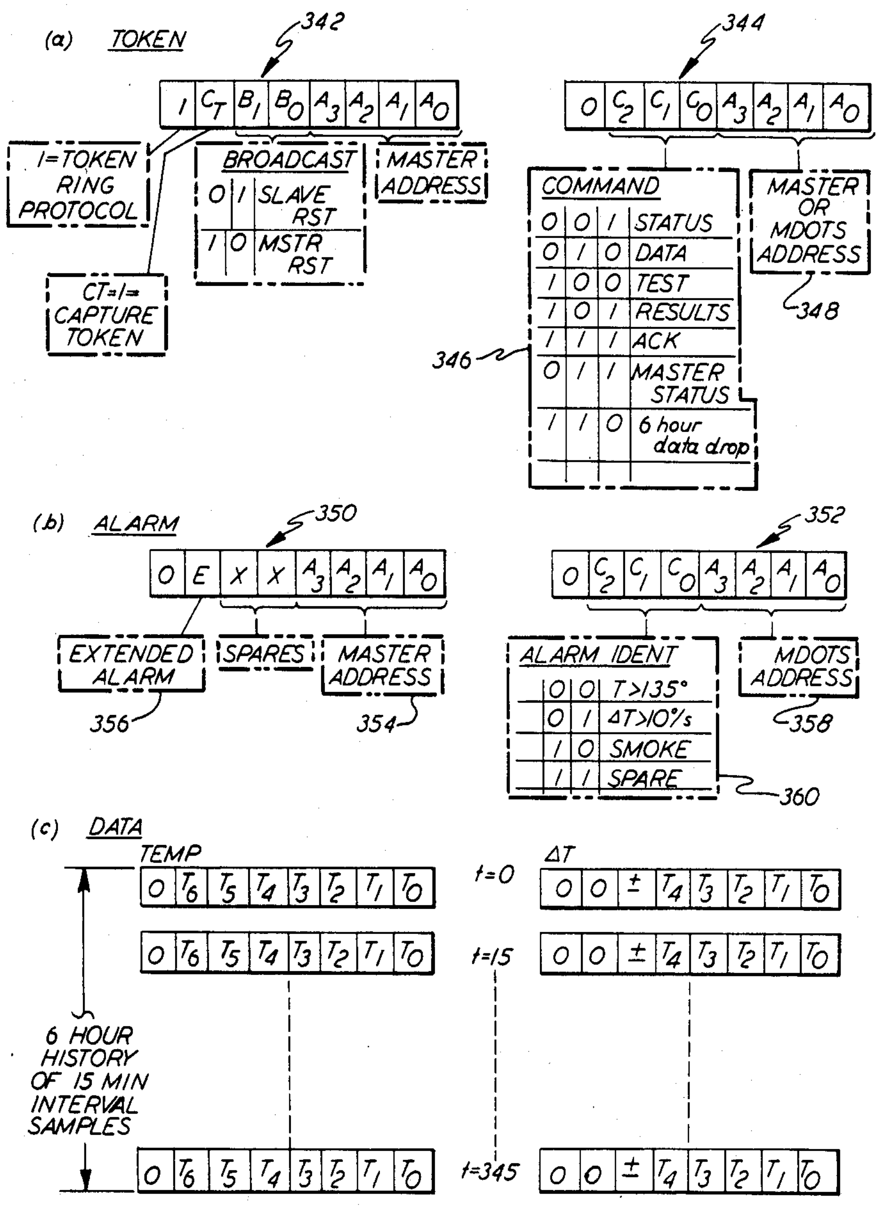
FIG. 7 is a diagram illustrating the information protocol between the central and master controls in the system embodiment of FIG. 1.

The central to master control protocol is basically the same as that of the master to sensor, with the exception that the token and poll command message are two bytes (di-byte) instead of one. The data messages transmitted through the master to central virtual data link are single byte. FIG. 7 illustrates the byte message formats between central and master.

FIG. 7(*a*) illustrates the token message in a di-byte 342, 344. The first byte 342 is identical to the master-sensor token except the four bit address is that of the master control being addressed. The same token ring protocol applies. The second byte 344 is identical to the master-sensor poll command message format. The $C_0$-$C_2$ three bit command library 346 is expanded to include commands for (i) master status, and (ii) extended interval (6 hour) data drop. The byte address 348 may be either master or MDOTS sensor, depending on the command.

FIG. 7(*b*) illustrates the alarm message format as including two bytes 350, 352. The first byte 350 includes master address 354 and an extended (E) alarm bit 356 which allows transmission of multiple alarms on a single token capture. The master notifies the central of an alarm only after performing a false alarm avoidance criterion on the data. This means the presence of the same or related alarm state on some number of successive polling samples. The second byte 352 identifies the alarmed sensor 358 and the alarm identification 360.

The token ring polling of the masters by the central control follows the protocol described for the master to sensor communications in FIGS. 5A, 5B and 6. The central control starts a token once in each two second interval for a 2400 baud data rate system, or once per second for a 4800 baud rate. The central to master poll rate on status is approximately once per 90 seconds. The only substantive difference with the master control response to the central is the additional decoded states used in the three bit command code, e.g. the master status and six hour data dump, both of which follow the data transmission sequence described for the sensor status and data messages to the master.

FIG. 7(*c*) illustrates the extended data dump provided by the master to the central, and is provided on a per sensor basis under control of the central control. The master concentrates the fifteen minute data samples on a per sensor basis for presentation to the central at extended intervals; approximately 6 hours.

As described with respect to the master control in FIG. 3, the master provides VDC power to the MDOTS sensors through the sensor bus. The master and central controls are themselve capable of being energized from either 48 VDC or 110-220 VAC sources. These alternate sources are each "protected", i.e. derived from the building's emergency (E) power source.

Although the invention has been shown and described with respect to a best mode embodiment thereof, it should be understood by those skilled in the art that various other changes, omissions, and additions to the form and detail thereof, may be made therein without departing from the spirit and scope of the invention.

What is claimed is:

1. Apparatus adapted to be disposed in a building space for measuring the environmental conditions of the space, comprising:

sensor means, for sensing the actual values of one or more parameters associated with the space environment, and for providing actual value sensed signals indicative thereof;

test means, disposed to provide actuation of said sensor means in response to a test command signal presented to said test means, said actuation causing said sensor means to provide test value sensed signals indicative of the operability of said sensor means; and signal processing means, responsive to said sensor means, said test means, and to control signals presented thereto, for presenting said actual value sensed signals at an output thereof in response to a first control signal presented thereto, and for presenting said test command signal to said test means and for presenting said test value sensed signals from said sensor means to said output in response to a second control signal presented thereto.

2. The apparatus of claim 1, wherein said sensor means includes temperature sensing means for providing a sensed signal indicative of the actual temperature in the space; and wherein said signal processing means includes memory means for storing signals, said processing means periodically sampling the value of said sensed actual temperature signal and storing said sampled temperature signal values in said memory means, said processing means presenting said sampled temperature signal values at said output in response to said first control signal.

3. The apparatus of claim 2, wherein said signal processing means further includes clock means for providing a real time signal, said processing means sampling said real time signal periodically and storing said sampled time signal values in said memory, said processing means calculating the ratio of the difference signal magnitude between successive sampled temperature signal values divided by the real time interval between said successive temperature samples, to provide at said output a rate of change of sensed temperature per unit time signal for said sensor means.

4. The apparatus of claim 1, wherein said sensor means includes smoke sensing means for providing a sensed signal indicative of the presence of smoke in the space; and wherein said signal processing means includes memory means for storing signals, said processing means periodically sampling the value of said sensed smoke signal and storing said sampled smoke signal values in said memory means, said processing means presenting said sampled smoke signal values at said output in response to said first control signal.

5. The apparatus of claim 4, wherein said signal processing means further includes clock means for providing a real time signal, said processing means sampling said real time signal periodically and accumulating said sampled time signal values in said memory in response to a sensed smoke signal indicating the presence of smoke in the space, to provide at said output a cumulative time signal indicative of the elapsed real time interval of the presence of smoke in the space.

6. The apparatus of claim 1, wherein said sensor means includes occupancy sensing means for providing a sensed signal indicative of the presence of occupants in the space; and wherein said signal processing means includes memory means for storing signals, said processing means periodically sampling the value of said sensed occupancy signal and storing said sampled occupancy signal values in said memory means, said processing means presenting said sampled occupancy signal values at said output in response to said first control signal.

7. The apparatus of claim 6, wherein said signal processing means further includes clock means for providing a real time signal, said processing means sampling said real time signal periodically and accumulating said sampled time signal values in said memory in response to a sensed occupancy signal indicating the presence of occupancy in the space, to provide at said output a cumulative time signal indicative of the elapsed real time interval of the presence of occupancy in the space.

8. A system for monitoring fire and security conditions in one or more spaces of a building, comprising:

sensor means, arranged in one or more groups, each group including one or more networks having one or more sensor means connected to a common sensor bus, each sensor means providing sensed signals indicative of the state of fire and security conditions in a space, and each sensor means presenting an alarm signal in the presence of sensed fire and security alarm condition in the space;

master control means, responsive to said sensed signals from a group of said sensor means, and including a master control signal processor having master control memory means for storing signals, said master signal processor periodically sampling said sensed signals from each sensor means in each network of said group at a first frequency and sampling at a sensed frequency said sensed signals from each said sensor means providing an alarm signal, said master signal processor storing said sampled signals in said master control memory means, said master control providing, at reporting intervals, alarm report signals identifying each sensor means presenting an alarm signal and the sensed signals received therefrom, and normal report signals identifying sensed signals received from sensor means without an alarm signal; and central control means, including a central signal processor having central control memory means for storing signals, and including keyboard means responsive to operator control, said central control means being responsive to said alarm report signals and said normal report signals from said master control means, said central control means further including central display means for displaying each said alarm report signals to an operator.

9. The system of claim 8, wherein said central control means further includes printer means for printing said alarm report signals and said normal report signals received from said master control means.

10. The system of claim 8, wherein said second frequency is greater than said first frequency.

11. The system of claim 8, wherein said central control means provides command signals to said master control means to regulate the reporting intervals of said alarm report signals and said normal report signals.

12. The system of claim 8, wherein said sensor means includes temperature sensing means for providing an actual temperature signal, and smoke sensing means for providing an actual smoke signal, which in combination provide sensed signals indicative of fire conditions in a space, and wherein said sensor means includes occupancy sensing means for providing an actual occupancy signal as a sensed signal indicative of security in the space.

13. The system of claim 12, wherein said sensor means further comprises:

sensor signal processor, including sensor memory means for storing signals and clock means for providing a real time signal, said sensor signal processor sampling said temperature sensing means, said smoke sensing means, said occupancy sensing means, and said timing signal, and storing said samples in memory, for providing as said sensed signals, said actual temperature signal, said actual smoke signal, a rate of change in temperature signal, and said actual occupancy signal.

14. The system of claim 13, wherein said signal processor accumulates a summation of said timing signal samples in memory in the continued presence of said actual smoke signal and, alternately, in the continued presence of said actual occupancy signal, to provide cumulative time signals indicative of the elapsed time of the presence of smoke and, alternately, to provide cumulative time signals indicative of the elapsed time of the presence of occupancy in the space.

15. The system of claim 12, wherein said sensor means further comprises:

test means, for periodically actuating each of said temperature sensing means, said smoke sensing means, and said occupancy sensing means, in response to a test command signal presented thereto from said central control means, through said master control means, wherein said central control means provides said test command signal periodically in response to operator control of said keyboard means, and wherein each said sensing means responds to actuation thereof to provide test value signals to said master control means, indicative of the operation of each said sensing means.

16. The system of claim 15, wherein said test means comprises:

heating element means, having filament means adapted to be energized to a minimum temperature sufficient to actuate said temperature sensing means to provide a test value temperature signal, by a current signal provided thereto in the presence of said test command signal and having smoke material means, disposed in proximity to said filament means, and responsive to said minimum temperature to provide a smoke test signal to actuate said smoke sensing means into providing a test value smoke signal.

17. The system of claim 16, wherein said occupancy sensing means includes a pyroelectric infrared detector responsive to a frequency band of infrared signals associated with human movement in the space, and responsive to said smoke test signal for providing a test value occupancy signal.

* * * * *

UNITED STATES PATENT AND TRADEMARK OFFICE
CERTIFICATE OF CORRECTION

PATENT NO. : 4,688,183

DATED : August 18, 1987

INVENTOR(S) : Richard T. Carll and Barry G. Blackaby

It is certified that error appears in the above-identified patent and that said Letters Patent is hereby corrected as shown below:

Column 1, line 31, "convers" should read --covers--

Column 1, line 31, after "security" insert --surveillance--

Column 5, line 45, after "less" insert --,--

Claim 16, line 56, after "signal" insert --,--

Signed and Sealed this

Twenty-first Day of August, 1990

*Attest:*

HARRY F. MANBECK, JR.

*Attesting Officer*

*Commissioner of Patents and Trademarks*